Dec. 25, 1951   A. NOVOTNY   2,579,851
METHOD OF PRODUCING LACTAMS OR THEIR HYDROLYTIC PRODUCTS
Filed July 17, 1947
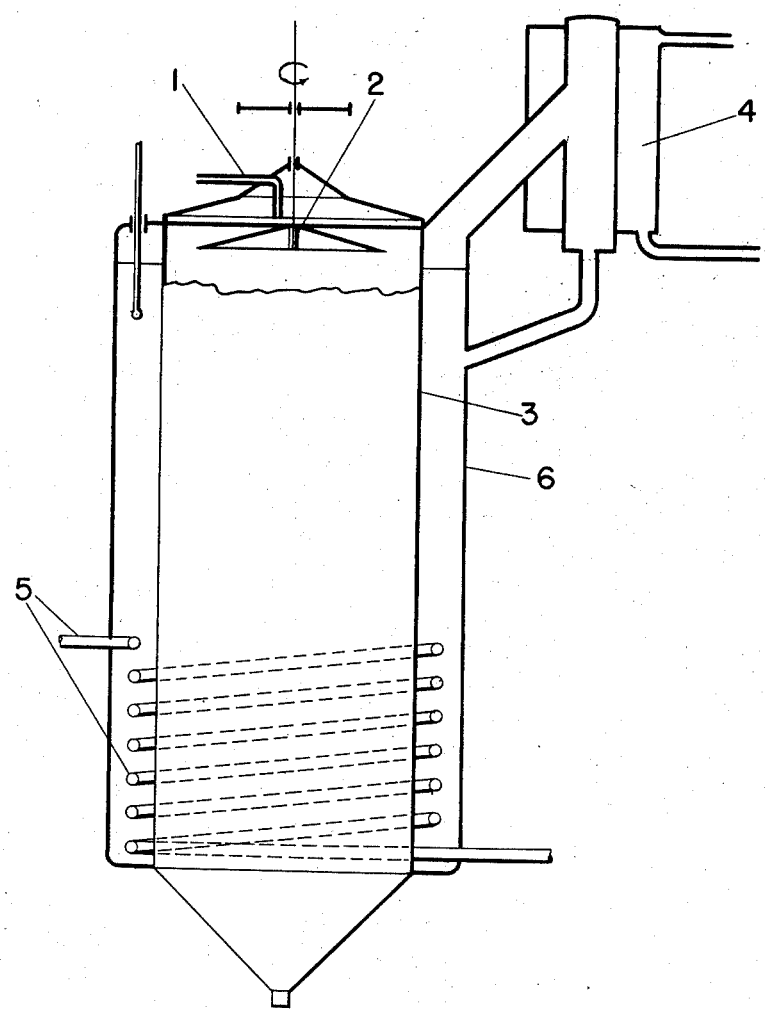
INVENTOR
ALOIS NOVOTNY
BY *John E. Eastlack*
ATTORNEY Patented Dec. 25, 1951

2,579,851

UNITED STATES PATENT OFFICE 2,579,851

METHOD OF PRODUCING LACTAMS OR THEIR HYDROLYTIC PRODUCTS

Alois Novotný, Zlin, Czechoslovakia

Application July 17, 1947, Serial No. 761,736
In Germany December 5, 1941

Section 1, Public Law 690, August 8, 1946
Patent expires December 5, 1961

12 Claims. (Cl. 260—239)

The hitherto used method of producing lactams or their hydrolytic products respectively consisted of a series of operations. At first it was necessary to prepare the corresponding oxime from a cyclic ketone and a hydroxylamin salt, for instance hydroxylaminsulphate. The acid component of the hydroxylamine salt had to be converted by neutralization to a salt, e. g. Glauber salt, representing waste product. The oxime had to be isolated out of the solution, purified and dried. Thereafter it was necessary to dissolve it attentively in concentrated sulphuric acid and to heat it to a temperature at which the Beckmann's rearrangement takes place, and this also. The mentioned rearrangement is accompanied by the releasing of a large amount of heat, so that the reaction has an explosive character and it was therefore impossible to heat at once more than 10 grams, the obtained solution of lactam being soiled by decomposition products and the reaction being connected with relatively great losses.

It has been found that it is possible to carry out the whole process in a very simplified manner, if the cyclic ketones are brought directly into reaction with hydroxylaminsulphate if desired with the addition of concentrated sulphuric acid or fuming sulphuric acid respectively, the reaction mixture being either immediately or after a certain time heated to a higher temperature. In this way solutions of lactams in sulphuric acid are obtained directly, without the necessity of isolating the oxime. Out of these solutions it is possible to isolate lactams either directly by the known processes, or it is possible to dilute the solutions and let them boil so as to bring about the hydrolysis. Out of the solutions, in a known way, omega-aminocarboxylic acids are isolated, which, as well as the majority of lactams, are suitable for the manufacture of valuable products, e. g. of polyamides.

The invention relates furthermore to different modifications of the above mentioned process, consisting of different methods of bringing about a reaction on a large scale without the danger of explosion or decomposition. A series of such modifications will be described in numerous examples, which however do not limit the extent of the invention, these examples serving only to explain the new process in a more detailed manner.

The method according to the invention offers numerous advantages, consisting in a thorough simplifying of the production and in the reduction of the initial costs. First of all, the isolation of the oxime and its drying, otherwise indispensable for carrying out its dissolution in the concentrated sulphuric acid, can be dispensed with. During the dissolution of the oxime in the sulphuric acid a considerable amount of heat develops, especially if the oxime is humid. If for instance at one stage the temperature should rise to a degree at which the Beckmann's rearrangement begins, the temperature would continue to rise spontaneously with a great velocity and the whole quantity of solution would explode, the hot concentrated sulphuric acid being simultaneously ejected in all directions. Therefore it is particularly advantageous if this operation can be dispensed with since it is very dangerous especially when preparing a large amount of solution.

A further advantage of the process consists in saving sulphuric acid, the acid, bound in the hydroxylaminsulphate, being entirely utilized. In some cases this bound acid is even completely sufficient to carry out the reaction, without any addition of free sulphuric acid. Only in cases where excessive density of the reaction mixture is troublesome, an additional quantity of sulphuric acid is added, if desired fuming sulphuric acid or a mixture of both respectively. In some cases it may be also advantageous to add diluting agents or solvents, though in general this measure may be dispensed with. All these additions can be made either at the beginning of the reaction or at any moment before its accomplishment.

The method according to the invention allows preparation of lactams not only in a much more safe manner than before, but also with a greater velocity and in a cheaper way. In several cases an increased yield is obtained too.

In the first phase of the reaction, when mixing cyclic ketones with hydroxylaminsulphate and if desired with sulphuric acid simultaneously, it is not necessary to heat the mixture. On the contrary, it is possible to mix at a normal temperature, if desired with external cooling and in the following phase only to increase the temperature to the necessary height, depending partially on the kind of ketone, and partially on the concentration of the sulphuric acid. Ketones which at the room temperature are solid, can be liquefied, before being brought into reaction, by moderate heating. The mixing at the room temperature can be continued until the mixture becomes homogeneous and there are no crystals of hydroxylaminsulphate to be observed. The temperature can be increased in different ways, e. g.

by letting the liquid mixture or the solution flow down in a thin film on a surface, heated to a suitable temperature, during which the excessive reaction heat is led away. Preferably this operation may be carried out in such a way that the liquid mixture of ketone together with the hydroxylaminsulphate flows in a thin film down the internal wall of a vessel, the heating jacket of which is filled up with a suitable liquid, e. g. with the solution of a suitable salt in water. In this way the wall of the vessel is automatically held at a suitable temperature and the excessive heat is led away in the form of evaporating heat. Even if the entry of the reaction mixture becomes more intensive, superheating to an inadmissible temperature is impossible. The liquid in the heating jacket begins only to boil more intensively and thus a large amount of heat is led away simultaneously. Change of the entering quantity of the reaction mixture produces therefore no injurious influence on the yield or on the purity of the product.

Another advantageous way of carrying out the reaction consists in letting flow successively, under a continuous stirring, a mixture of cyclic ketone together with hydroxylaminsulphate into sulphuric acid or into a solution of lactam in sulphuric acid respectively, heated to a necessary temperature, preferably to between 90 and 160° C. In this case it is not necessary to prepare the reaction mixture in advance, in the state of a homogeneous liquid by rather long agitation, for it is quite sufficient to use a fresh heterogeneous mixture. It is however possible to bring cyclic ketone and hydroxylaminsulphate, if desired with other additions too, into the reaction vessel at separate places, so that they are brought into contact in the reaction mixture only, heated to a suitable temperature. At higher temperatures, e. g. at between 90 and 160° C. the whole process is instantaneous without possibility of producing intermediate products. This process can be carried out in a continuous or in a discontinuous way. When using for instance the continuous way, cyclic ketone, hydroxylaminsulphate and if desired sulphuric acid and/or fuming sulphuric acid respectively are brought into the upper part of the reaction vessel, are provided with a stirring device, and the solution of lactam in sulphuric acid is drawn out, continuously or periodically, at the bottom of the vessel. The heating jacket of the vessel is filled up with a liquid of a suitable boiling point which, at the beginning, is heated e. g. by means of a heating coil to a necessary temperature. Further heating from outside can be dispensed with, because the liquid is held at the boiling point by the excessive reaction heat which is led away in this manner.

In order to prevent eventual soiling of the product by raw materials or by intermediate products, there may be arranged a further device, in which the reaction is terminated. A simple device of this kind may consist of a container, heated externally to a temperature which may be more elevated than the temperature in the main reaction vessel, since there is no danger of an explosion now.

Another embodiment of the process according to the invention consists in preparing in advance a solution of hydroxylaminsulphate in concentrated sulphuric acid whereafter the cyclic ketone is led successively in small doses into this solution, heated to a necessary temperature. The reaction takes place immediately when the ketone comes in contact with the hot liquid. To hold the reaction mixture at a suitable temperature and to lead away the excessive heat it is possible to use the way mentioned above.

For carrying out the method according to the invention it is not necessary to start with a pure hydroxylaminsulphate, prepared separately; it is however possible to start with a concentrated solution, obtained by electroreduction of nitric acid. This solution contains sulphuric acid in the necessary amount.

An addition of fuming sulphuric acid is advantageous for binding the water built up in the course of the reaction. Furthermore the addition of fuming sulphuric acid allows working at lower temperatures.

If instead of lactam a corresponding omega-aminocarboxylic acid is required as the final product, one does not neutralise the obtained solution, but the solution of lactam in sulphuric acid is diluted and heated only in a known way, and if desired is boiled, whereafter the ion $SO_4$ is removed in the form of an insoluble salt, e. g. a calcium or barium salt and the amino acid is recovered out of the filtrate by evaporating, if desired in connection with a further refinement.

Apparatus that can be used to carry out methods according to the present invention is shown diagrammatically in the accompanying drawing.

The apparatus shown comprises the following devices and parts, namely: a supply pipe 1; a divider or distributor 2 for spreading the liquid supplied by the pipe 1; a cylindrical vessel 3 in which occurs the intramolecular rearrangement by which the lactams are produced; a jacket 6 by which the vessel 3 is surrounded; a heating coil 5 inside the jacket for boiling a liquid therein; and a reflux condenser or cooler 4 into which vapour from the boiling liquid rises to be condensed and from which the condensate returns to the jacket 6.

EXAMPLE 1

82 grams of technically pure hydroxylaminsulphate in the form of a fine powder is stirred at the room temperature together with 98 grams of cyclohexanon, containing 87 per cent of pure cyclohexanon, for 3–4 hours. After a short while it was possible to notice a surprising disappearing of crystals, the viscosity of the reaction mixture increasing simultaneously. After the above mentioned period of time 150 grams of concentrated sulphuric acid together with 100 grams of fuming sulphuric acid (54 per cent $SO_3$) are added to the dense reaction mixture under an intensive stirring and cooling whereby a homogeneous, orange coloured, viscous solution is obtained. This solution is led through the pipe 1 onto the divider 2 of the device, shown in the accompanying drawing, at such a rate of supply as to increase the temperature of the reaction mixture to 120° C. The solution flows in a thin film down the internal wall of the cylinder 3. The outer jacket contains a boiling solution of calcium chloride, the boiling point of which amounts to 115° C. The temperature is held at a constant height by means of this boiling bath, the excessive reaction heat being led away in a rapid and even manner. The jacket is connected with the reflux cooler 4. A heating coil 5 is provided to bring the bath into action. If required, the reaction mixture can be heated for a further short period of time to a still more elevated temperature in order to secure a perfect reaction. In most cases however this measure may be dispensed with. The reaction mixture, flowing away at the bottom, has been cooled, poured onto the ice and the obtained solution is neutralized by soda to a value of pH 6.5–7. The temperature varies at the same time between minus 7 and plus 3° C. The filtered solution is extracted 15 times, every time together with 50 cubic centimetres of chloroform; then the chloroform is distilled off and the raw lactam purified by distillation in vacuo. The yield amounted to 90 per cent of theory.

EXAMPLE 2

164 grams of hydroxylaminsulphate, ground to fine crystals, are intensively stirred together with 160 grams of cyclopentanon (boiling point between 125 and 126° C.) for such a period of time as to form a viscous yellow solution (8 hours). Thereafter 256 grams of sulphuric acid (94.7 per cent) is added by portions, under an intensive stirring and external cooling, to the viscous reaction mixture, whereby an orange coloured solution is produced. This solution is led onto the divider 2 of the device, described in the foregoing example, at such a rate of supply that the temperature of the reacting solution amounts to 150° C. The cooling jacket is filled up with a solution of calcium chloride, boiling at 137° C. The solution flowing out at the bottom is diluted with 1200 cubic centimetres of water, filtered, activated charcoal being added, and the filtrate is boiled for two hours under a reflux cooler. In order to obtain a marked alkaline reaction, lime water is added to the still hot solution. The calcium sulphate is filtered off and boiled with water five times in succession. Then the united filtrates are boiled for such a period of time as to make the ammonia odour disappear. The dissolved calcium sulphate is removed by means of $Ba(OH)_2$ and the hot solution saturated by carbon dioxide to the value of pH=7. After decolouring by means of active charcoal and filtering the solution is evaporated in vacuo until crystallization begins. On the following day the crystals are filtered off and washed with alcohol. The mother liquors are treated in order to obtain further portions of amino-acid. In this way a theoretical yield of the delta-aminovaleric acid may be obtained. The melting point of the pure delta-aminoacid, obtained in this way, amounts of 159° C.

EXAMPLE 3

100 cubic centimetres of concentrated sulphuric acid (density 1.84) is heated in a still on a boiling water bath to 95–97° C. The still was provided by a stirring device, a thermometer and a dropping funnel. The dropping funnel contained a mixture of technical cyclohexanon (98 grams) together with solid hydroxylaminsulphate (82 grams), maintained by continuous stirring in a homogeneous suspension. The entry of the suspension was adjusted in such a way as to hold the temperature in the still at between 102 and 105° C. In half an hour the whole amount of the suspension will have been brought into the vessel. Thereafter the content of the still is heated for 30 minutes more on a boiling water bath. After cooling the solution is poured out onto 1600 grams of ice and neutralized by means of a concentrated soda solution to the value of pH=7. The temperature is between minus 9 and plus 3° C. Afterwards the solution is decoloured by means of active charcoal and extracted twelve times, every time with 80 cubic centimetres of chloroform. The extract is dried with calcined sodium sulphate, the chloroform is distilled off. The raw epsilon-caprolactam is distilled in vacuo. The yield of pure epsilon-caprolactam amounted to 85 per cent of theory.

EXAMPLE 4

A suspension of 41 grams of finely ground hydroxylaminsulphate in 49 grams of technical cyclohexanon is treated in the same way in a device described in the foregoing example in 50 cubic centimetres of preheated sulphuric acid (density 1.84). The brown viscous solution is diluted by 400 cubic centimetres of distilled water and filtered with a small addition of active charcoal. Then the filtrate is boiled for 2 hours under the reflux cooler. To the still hot solution there is added such an amount of lime water as to bring about the alkaline reaction on phenolphthaleine. The calcium sulphate is filtered off and is boiled with water five times in succession. The united filtrates are boiled for such a period of time as to make the ammonia odour disappear, and then brought into reaction with a computed amount of a saturated solution of $Ba(OH)_2$, removing the dissolved calcium sulphate. The still hot mixture is saturated by carbon dioxide to the value of pH=7. After decolouration with active charcoal and filtering the solution is evaporated in vacuo. The melting point of the obtained epsilon-aminocaproic acid amounts to between 202 and 203° C. The yield amounts to 94 per cent of theory.

EXAMPLE 5

82 grams of technical hydroxylaminsulphate and 184 grams of sulphuric acid (97.7 per cent) are weighed in a still, provided with a stirring device, a thermometer and a dropping-funnel. Under a continuous stirring the content of the still is heated on a boiling water bath to between 95 and 97° C. Thereafter 98 grams of technical cyclohexanon (87.2 per cent) is added by drops with such a rate of supply as to hold the temperature between 102 and 106° C. The entry of the whole amount of cyclohexanon into the reaction vessel lasts 40 minutes. The heating continued for 20 minutes more. Afterwards the liquid is diluted by 800 cubic centimetres of distilled water and filtered after the addition of a small amount of active charcoal. The filtrate is boiled for 1 hour and the hot solution poured into a boiling solution of barium hydrate namely 720 grams of $Ba(OH)_2.8H_2O$ in 900 cubic centimetres of water. The precipitated substance is filtered off and boiled three times with water. The filtered liquors are added to the main alkaline filtrate and the whole is saturated by carbon dioxide and filtered after the decoloration by active charcoal. The filtrate is evaporated in vacuo. The yield of pure epsilon-aminocaproic acid amounted to 90 per cent of theory.

EXAMPLE 6

82 grams of technical hydroxylaminsulphate is dissolved in 92 grams of sulphuric acid (density 1.84) under addition of 10 grams of fuming sulphuric acid (60 per cent of $SO_3$) .98 gram of technical cyclohexanon together with 125 grams of fuming sulphuric acid (60%) are added by drops into the solution heated to between 95° and 97° C. The rate of supply is adjusted in such a way that the reaction temperature is 102°–106° C. The whole quantity is brought into the reaction vessel in 55 minutes. The heating is continued for 20 minutes in a boiling water bath. After cooling the whole is poured out onto 1600 grams of ice and neutralized by a saturated soda solution to the value of pH=7. During the neutralization the temperature varies between minus 8 and plus 1.5° C. After a small addition of active charcoal the whole is filtered and the filtrate shaken out 12 times in cold state, every time with 50 cubic centimetres of chloroform. After the chloroform is distilled off, the raw cyclohexanone isooxime is distilled in vacuo (boiling point between 138° and 140° C. at 12-13 mm. Hg). The yield amounted to about 69% of theory.

EXAMPLE 7

87 grams of hydroxylaminsulphate is dissolved in 288 grams of sulphuric acid (92%) and heated to 125° C. Hereafter 80 grams of cyclopentanon is added out of a dropping-funnel under a continuous stirring with such a supply rate as to make up the losses of heat by the developing reaction heat, the temperature varying between 130° and 134° C. During the reaction the reaction vessel is cooled by means of a hot bath (solution of calcium chloride). The temperature of the bath increases during the process spontaneously by the developing reaction heat (without a special outside source of heat) to between 105° and 110° C. The losses of heat increase in such a way, that cyclopentanon can be added with a greater supply rate in order to make up the heat losses and to hold the temperature at a predetermined degree. After the addition of the whole amount of cyclopentanon heating to between 135° and 136° C. is continued for 10 minutes more, whereafter the reaction solution is treated in the same way as in the Example 5. The yield of the pure delta-aminovaleric acid amounted to 98% of theory.

EXAMPLE 8

4.2 grams of hydroxylaminsulphate is dissolved in 5 grams of 96%-sulphuric acid and heated to 110° C. Thereafter 5 grams of suberon (cycloheptanon) is added out of a small dropping-funnel under a continuous stirring at such a supply rate as to hold the temperature of the mixture at between 112-118° C. by the proper reaction heat. At the same time as the ketone further 10 grams of 100%-sulphuric acid are added by drops. The reaction still is submerged into a hot solution of calcium chloride, the temperature of which is maintained by the developing reaction heat at between 105° and 110° C. After the addition of the whole amount of suberon and sulphuric acid, i. e. after 10 minutes the mixture is heated for 10 minutes more to between 119° and 120° C. After cooling the content is transformed partially to 7-oenantholactam and partially to 7-aminooenanthoic acid.

A half of the reaction mixture is poured out onto ice, neutralized by soda solution to a weak alkaline reaction and filtered after addition of a small amount of active charcoal. The filtrate is shaken out eight times with chloroform, the whole amount of which being 55 cubic centimetres. The chloroform extracts, dried by means of calcined sodium sulphate is filtered and the chloroform is distilled off. The obtained raw 7-oenantholactam is subjected to a distillation in vacuo. Boiling point between 161° and 163° C. at 19 mm. Hg. The yield amounted to 93% of theory.

The other half of the reaction mixture is diluted by 29 cubic centimetres of water, decoloured by means of active charcoal, filtered and then boiled for 5 hours, whereafter the solution is treated in a way similar to that in the Example 5. The yield amounted to 90.3% of theory. Melting point of the 7-aminooenanthoic acid after the crystallization out of the 70%-alcohol amounts to 187° C.

EXAMPLE 9

2.24 grams of cyclopentadekanon in a liquid state (melting point 64° C.) is added in portions under stirring into a solution of 1 gram of hydroxylaminsulphate in 6 grams of 96%-sulphuric acid, the solution being preheated to 125° C. The ketone is supplied at such a rate that the temperature of the reaction mixture is maintained between 130° and 140° C. The addition of the keton lasts 5 minutes. Then the reaction mixture is heated for 5-7 minutes more to 140° C. After cooling the reaction mixture is treated in order to obtain cyclopentadekanonisoxime (2-oxo-cyclo-1-aza-hexadekan) and 15-aminopentadekanoic acid respectively.

One half of the reaction mixture is poured onto ice together with a concentrated soda solution till a marked alkaline reaction takes place. In this way there is eliminated a greasy mass which begins to stiffen soon. This mass is dissolved in 30 cubic centimetres of ether, shaken and then allowed to stand. The remaining aqueous solution is shaken 6 times with 40 cubic centimetres of ether. The etheric extracts are added to the main etheric solution, dried by calcined sodium sulphate, filtered and the ether is distilled off. The melting point of the raw isoxime is between 128° and 130° C., after crystallization out of alcohol to 133°-133.4° C. The constitution has been exactly established by means of an elementary analysis as well as by means of a hydrolysis. The yield amounted to 93.7% of theory.

To the other half of the reaction mixture there is added such a quantity of water as to give the mixture a boiling point of 130° C. Afterwards the mixture is boiled for 3 hours under a reflux cooler. After this period of time the volatile constituents are evaporated off. After cooling the brown wax like mass is sucked off, duly washed out by water in order to remove the sulphuric acid and after decolouration by active charcoal crystallized out of a 50%-boiling alcohol. The yield amounted to 90.5% of theory. The constitution of 15-aminopentadekanoic acid has been established by an elementary analysis.

EXAMPLE 10

82 grams of technical hydroxylaminsulphate is dissolved in 184 grams of 97.7% sulphuric acid. 98 grams of technical cyclohexanon (87.2%) are added by drops to the solution, preheated to 95° C. The rate of supply is adjusted in such a way that the reaction temperature reaches 102°-106° C. In order to accelerate the process, the still is submerged into a boiling water bath. The reaction still is provided with a stirring device, a thermometer and a dropping funnel. Within 40 minutes the whole amount has entered the reaction vessel. Then the heating is continued in a boiling bath for 15 minutes more. After cooling the reaction liquid is poured onto 1500 grams of ice and neutralized by means of saturated soda solution to the value of pH 7. At the end of the neutralization the temperature is 1° C. After a small addition of active charcoal the mass is filtered and the filtrate, in cold state, is shaken out 11 times with chloroform, the whole amount of which is 650 grams.

After having distilled off the chloroform, the raw 6-caprolactam is distilled in vacuo. Boiling point between 137° and 141° C. at 12-13 mm. Hg. The yield of pure lactam amounted to 78% of theory.

EXAMPLE 11

100 cubic centimetres of sulphuric acid (density 1.84) is brought into a still, provided with a stirring device, a thermometer, a dropping funnel as well as by a small worm conveyor for an automatic supply of hydroxylaminsulphate. After the stirring device is put into action, the contents of the still are heated to 97° C. on a water bath. Then the worm conveyor is put in action and immediately begins to supply cyclohexanon by drops. The entry of cyclohexanone has been adapted to the speed of the worm conveyor in such a way that the both components—cyclohexanon and the solid hydroxylaminsulphate—are added in a stoichiometric proportion. The amount added in a unit of time is adjusted for the components in such a way, that the temperature of the still content is maintained by means of the proper reaction heat at between 102 and 105° C. A mixture of 85 grams of hydroxylaminsulphate and 98 grams of technical cyclohexanon (with 87% of ketone) is used. After the entry of this amount the heating on the water bath is continued for 10 minutes more and then the solution is allowed to cool slowly. The brown viscous solution is afterwards treated partially to 6-caprolactam, partially to 6-aminocaproic acid.

A. 6-caprolactam

One half of the obtained liquid is poured onto ice, diluted with water and neutralized to the value of pH=7 by means of calcium carbonate. After the neutralization the temperature amounts to 0° C. The calcium sulphate is filtered off and washed 5 times by boiling water. The raw lactam is rectified under a reduced pressure. The yield of the lactam that crystallizes amounts to 35.2% of theory. Boiling point 146–147° C. at 17–18 mm. Hg.

B. 6-aminocaproic acid

The other half of the brown solution (183 grams) is diluted by 400 cubic centimetres of distilled water and filtered a small amount of active charcoal being added beforehand. Then the filtrate is boiled under a reflux cooler for an hour. To the still hot solution such an amount of lime water is added as to bring about the alkaline reaction on phenolphthalein. The calcium sulphate is filtered off and boiled 5 times with hot water. The united filtrates are boiled for such a period of time as to make the ammonia odour disappear, and brought into reaction with a saturated solution of 7.5 grams of $Ba(OH_2).8H_2O$. The still hot mixture is saturated by carbon dioxide to the value of pH=7. After decolouration by active charcoal and filtration the solution is evaporated in vacuo. The melting point of the obtained 6-aminocaproic acid, the yield of which amounted to 94% of theory, was between 202 and 203° C.

EXAMPLE 12

1 gram of hydroxylaminsulphate is dissolved in 6 grams of sulphuric acid (96%) and then 2.24 grams of cyclopentadekanon (melting point 64° C.) added in portions under stirring and external cooling. A small amount of the solution obtained is heated to 125° C. and then the remaining solution added by drops at such a rate of supply that the temperature of the reaction mixture is maintained by means of the proper reaction heat at between 130° and 140° C. During the reaction the reaction still is cooled by a hot solution of calcium chloride. After the addition of the whole amount of the components the reaction mixture is heated for 7 minutes more to between 135° and 140° C. After cooling it is poured onto ice, neutralized by soda solution up to a weak alkaline reaction, the precipitated mass is dissolved in 25 cubic centimetres of ether and the aqueous solution five times more extracted with ether. The whole amount of ether is 35 cubic centimetres. The etheric solutions, dried by calcined sodium sulphate, are filtered and the ether is distilled off. The yield of raw lactam, the melting point of which amounted to between 129° and 130° C., is 94% of theory.

EXAMPLE 13

At first nitric acid has been subjected to the known electro-reduction (Julius Tafel, Zeitschrift f. anorg. Chemie, 31, 289–325). 588 grams of nitric acid (density 1.32) is electrolysed under addition of 3,570 grams of 50% sulphuric acid, acting as catholyte. After the accomplished reduction (that is, when the reaction on $HNO_3$ has ceased) the obtained solution is filtered and concentrated in vacuo. At the beginning it is heated on a water bath, later on an oil bath at 130° C. and at 5 mm. Hg. The yield amounted to 2,030 grams of thick brown solution which contained, according to the analysis, 14.42% $(NH_2OH)_2.H_2SO_4$ and 73.8% of 100% sulphuric acid. This solution is indicated A.

285 grams of A is preheated in a glass still to 100° C. The still was provided with a stirring device, a thermometer and a dropping funnel. Out of the dropping funnel technical cyclohexanon is progressively added at such a rate of supply that the temperature has been steadily held at 116° C. Within one and a half hours 56 grams of cyclohexanon is treated. Thereafter the heating is continued for 40 minutes more to 116° C. After cooling the content of the still is treated partially in order to obtain 6-caprolactam, partially in order to obtain 6-aminocaproic acid.

170 grams of reaction mixture is poured out onto ice and neutralized by soda. On completion of neutralization the temperature amounts to 1° C. The aqueous solution is decoloured by means of active charcoal and shaken six times with chloroform, every time with 25 cubic centimetres. The chloroform is distilled off and the raw lactam purified by distillation in vacuo. Boiling point 142° C. at 11 mm. Hg. The yield amounted to 7.5 grams.

Other 167 grams of reaction mixture is diluted by 500 cubic centimetres of water, decoloured by means of active charcoal and boiled for one hour. To the hot solution there is added such an amount of hot barium hydrate solution as to bring about a marked alkaline reaction on phenolphthaleine. The barium sulphate is filtered off and boiled three times with water. The filtrates are added to the main yield. The excessive barium hydrate is removed by saturation with carbon dioxide. The hot neutral filtrate is saturated with hydrogen sulphide, filtered once more, decoloured by active charcoal and the pure decoloured solution is evaporated in vacuo. The yield of 6-aminocaproic acid (melting point 201° C.) amounted to 30.6 grams. This yield corresponds to 94% of theory.

EXAMPLE 14

285 grams of A solution is preheated to 125° C. and 42 grams of cyclopentanon is added by drops, the solution being stirred meanwhile and the addition being at such a rate that the temperature of the reaction mixture is maintained between 132 and 134° C. The reaction heat is continuously led away as evaporating heat by means of a hot solution of calcium chloride. The temperature of the bath increases during the reaction without heating from outside to 105-110° C. After all the amount of the reaction mixture has entered the reaction vessel, the heating is continued for 5-6 minutes more to 136° C. After cooling the content of the still is treated partially to piperidone (delta-valerolactam) and partially to 5-aminovaleric acid.

One half of the reaction mixture is poured out onto ice, neutralized with soda solution and extracted eight times with chloroform, the whole amount of which is 100 cubic centimetres. The chloroform is distilled off. The dried chloroform extracts and the raw piperidone are distilled in vacuo. Boiling point between 145 and 147° C., at 20 mm. Hg. The yield amounted to 5 grams. The low yield was due to the hydrolysis, the lactam being converted to the 5-aminovaleric acid.

EXAMPLE 15

28.5 grams of the A solution is heated to 125° C. and then 5.6 grams of suberon is added by drops with such a velocity as to hold the temperature by means of the reaction heat at between 125 and 127° C. After the addition of the suberon the heating is continued for 7 minutes more to 126° C. After cooling the mixture is treated in the described way to 7-oenantholactam and to 7-aminooenanthoic acid. The yield of pure lactam amounted to 70% of theory, that of pure 7-aminooenanthoic acid to 88% of theory.

Having thus described my invention, what I claim as new and desire to secure by Letters Patent of the United States is:

1. A method of producing lactams which comprises mixing sulphuric acid and hydroxylamine sulfate, adding a cyclic ketone to the mixture to react with the hydroxylamine sulphate at raised temperature, and separating out the lactam from the reaction mixture.

2. A method of producing cyclic lactams which comprises bringing a cyclic ketone and hydroxylamine sulphate into reaction at raised temperature by admixture with a hydrate of sulphur trioxide, and separating out the required product by extracting the at least partially neutralized reaction mixture and fractioning the obtained extract.

3. A method according to claim 2 including also subjecting the reaction mixture to the influence of a liquid, which has a boiling point about the level of said raised reaction temperature, initially heating said liquid to about its boiling point and evaporating said liquid by transferring excess reaction heat from the mixture so as to hold the mixture at about said temperature.

4. A method according to claim 3 including also extracting excess heat from the reaction mixture, drawing off the product of the reaction as a liquid, and applying heat to the drawn-off liquid to complete the reaction more fully.

5. A method according to claim 2 in which the reaction between the ketone and the hydoxylamine sulphate is confined between the temperature limits 90° C. and 150° C.

6. A method according to claim 2 in which the hydroxylamine sulphate and the hydrate of sulphur trioxide are admixed, the mixture is stirred, and the cyclic ketone is added slowly into the mixture to react at the raised temperature, stirring being maintained during the addition.

7. A method of producing cyclic lactams which comprises dissolving hydroxylamine sulphate in a sulphuric acid, slowly adding to the solution a mixture of a cyclic ketone and a sulphuric acid, the addition of said mixture being at a rate which results in reaction between the hydroxylamine sulphate and the ketone in the total mixture at raised temperature, and thereafter separating out the required product by extracting and fractioning the total reaction mixture.

8. A method according to claim 7 including also subjecting the reaction mixture to the influence of a liquid, which has a boiling point about the level of said raised reaction temperature, initially heating said liquid to about its boiling point and evaporating said liquid by transferring excess reaction heat from the mixture so as to hold the mixture at about said temperature.

9. A method according to claim 8 including also extracting excess heat from the reaction mixture, drawing off the product of the reaction as a liquid, and applying heat to the drawn-off liquid to complete the reaction more fully.

10. A method according to claim 2 in which the cyclic ketone, the hydroxylamine sulphate and the hydrate of sulphur trioxide are led into admixture continuously and simultaneously.

11. A method of producing cyclic lactams which comprises electro-reducing nitric acid in admixture with sulphuric acid to make a solution containing hydroxylamine sulphate and sulphuric acid, concentrating said solution, heating said solution, slowly adding a cyclic ketone to the hot concentrated solution to make a reaction mixture, meantime stirring the same, and separating out the required product from the reaction mixture.

12. A method according to claim 11 in which the cyclic ketone is added at a rate which maintains the reaction temperature between 90° C. and 150° C.

ALOIS NOVOTNÝ.

REFERENCES CITED

The following references are of record in the file of this patent:

UNITED STATES PATENTS

| Number | Name | Date |
|---|---|---|
| 2,249,177 | Schlack | July 15, 1941 |
| 2,313,026 | Schlack | Mar. 2, 1943 |
| 2,351,381 | Wiest | June 13, 1944 |

FOREIGN PATENTS

| Number | Country | Date |
|---|---|---|
| 577,696 | Great Britain | May 28, 1946 |

OTHER REFERENCES

Ungnade et al., J. Org. Chem., vol. 10, pp. 29-33 (1945).